United States Patent
Shi et al.

(10) Patent No.: US 6,411,689 B1
(45) Date of Patent: Jun. 25, 2002

(54) FACSIMILE CALL SUCCESS RATES IN LONG DELAY ENVIRONMENTS

(75) Inventors: Junhao Shi, Gaithersburg, MD (US); Brandt Springman, Washington, DC (US); Santharam Gurumani, Gaithersburg, MD (US); Channasandra S. Ravishankar, Germantown, MD (US); Sundari Balachandran, Rockville, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/247,846

(22) Filed: Feb. 11, 1999

Related U.S. Application Data (60) Provisional application No. 60/096,790, filed on Aug. 17, 1998.

(51) Int. Cl.[7] .............................................. H04M 11/00
(52) U.S. Cl. ............................. 379/100.17; 379/100.05; 379/100.09
(58) Field of Search ................. 379/93.05, 93.07–93.08, 379/100.01, 100.05, 100.09, 100.17; 358/400, 405–407, 434–436, 438–439, 442–443; 455/12.1, 13.1, 524; 709/235–237; 370/278, 328, 279

(56) References Cited

U.S. PATENT DOCUMENTS

| | | | | |
|---|---|---|---|---|
| 4,918,746 A | * | 4/1990 | Serizawa | 455/524 |
| 5,721,830 A | * | 2/1998 | Yeh et al. | 709/237 |
| 5,790,641 A | * | 8/1998 | Chan et al. | 379/100.17 |
| 5,802,154 A | * | 9/1998 | Dimolitsas et al. | 379/100.17 |
| 5,877,871 A | * | 3/1999 | Smith et al. | 358/442 |
| 5,949,861 A | * | 9/1999 | Chan et al. | 379/100.17 |
| 6,115,142 A | * | 9/2000 | Leung | 358/434 |
| 6,147,978 A | * | 11/2000 | John et al. | 370/279 |
| 6,226,277 B1 | * | 5/2001 | Chuah | 370/328 |

FOREIGN PATENT DOCUMENTS

JP  05037759  *  2/1993  ............ H04N/1/32

* cited by examiner

Primary Examiner—Duc Nguyen
Assistant Examiner—George Eng
(74) Attorney, Agent, or Firm—John T. Whelan; Michael W. Sales (57) ABSTRACT

A facsimile transmission relay apparatus, referred to as an Intelligent Facsimile Relay (IFR) for improving call success rates in long delay environment such as terrestrial cellular, fixed wireless, and geostationary mobile satellite systems and the like. A first bi-directional telecommunications interface is provided for receiving facsimile signals from a transmitting facsimile device via a first network such as a Public Switch Telephone Network (PSTN). A buffer memory is used by the IFR for storing the facsimile signal, and a second bi-directional telecommunications interface retransmits the facsimile signal via the second network, e.g., a wireless network, to a receiving facsimile device to avoid signal collisions between the devices. An information processor is coupled to the second interface for monitoring messages from the receiving facsimile device and for generating messages to the receiving facsimile device to maintain communications integrity with the transmitting facsimile device via the first and second networks.

17 Claims, 5 Drawing Sheets

ILLUSTRATION OF ACCESS METHODS AND DELAY RANGES IN WIRELESS ENVIRONMENTS

FIG. 1 ILLUSTRATION OF ITU-T T.30 PROTOCOL SEQUENCE FOR A TYPICAL TWO PAGE FACSIMILE CALL

FIG. 2

ILLUSTRATION OF ACCESS METHODS AND DELAY RANGES IN WIRELESS ENVIRONMENTS

FIG. 3

ILLUSTRATION OF SIGNAL COLLISION ON
TWO-WIRE LINK DUE TO LONG DELAY

FIG. 4  ILLUSTRATION OF DIS-DCS COLLISION HANDLING BY INTELLIGENT FAX RELAY (IFR)

FIG. 5   FLOW CHART OF A TYPICAL IFR FUNCTIONALITY IN HANDLING DIS-DCS COLLISION

FACSIMILE CALL SUCCESS RATES IN LONG DELAY ENVIRONMENTS

This application claims the benefit under 35 U.S.C. §119(e) of the filing date of the provisional application No. 60/096,790 filed Aug. 17, 1998.

BACKGROUND OF THE INVENTION

The present invention relates to methods and apparatus for increasing facsimile call success rates. More particularly, the invention relates to facsimile call transmissions in the presence of long delays and channel errors such as those present in wireless access systems, e.g., terrestrial cellular, fixed wireless, and geostationary mobile satellite systems.

Conventional facsimile machines and compatible terminals are designed for communication over a public service telephone network. Standard protocols have been adopted for communication between calling and called facsimile terminals. Examples of such protocols are those defined by the International Telegraph and Telephone Consultative Committee (CCITT) under Recommendations T.3 and T.4, known respectively as the Group 2 and Group 3 facsimile protocols. Recommendation T.30 defines a protocol for Group 2 and 3 facsimile equipment for communication over a telephone network.

Previous techniques such as flag-stuffing require explicit knowledge of delays in the systems for it to be effective, since International Telecommunications Union standard ITU-T T.30 limits the duration of High Level Data Link Control (HDLC) frames, which includes HDLC flags. Knowledge of delay would assist the flag-stuffing technique to determine the time at which flag-stuffing should start so as not to violate the T.30 frame duration constraints.

An alternative means for communication between facsimile terminals has been proposed, in which each facsimile terminal is connected to a facsimile interface unit for communication via a public service telephone network to demodulate the signal that was modulated by the facsimile machine and transmit the demodulated data on digital satellite/cellular links, and modulate the data received over these links towards the end facsimile machines. This has the advantage of conserving band-width on bandwidth-limited satellite/cellular networks, since otherwise the modulated signal would have to be carried at the rate of 64 kbps. Thus, encoded data suitable for transmission over a digital network is provided, for example a digital satellite link or a cellular telephone system. However, the introduction of the Facsimile Interface Units (FIU) adds processing delay to the long propagation delays in satellite/cellular networks that might further decrease call success rates. One example where the processing delay becomes a significant source is the facsimile demodremod unit associated with Digital Circuit Multiplication Equipments (DCME), where processing/buffering delay can be as high as 300 ms. This increased delay may cause failures in communication between the calling and called facsimile terminals. A standard for overcoming this increased delay is not provided under the Group 3 fax protocol.

The document WO 92/02100 discloses a facsimile interface unit which automatically sends a "command repeat" signal to a facsimile terminal on receipt of a command therefrom, in order to allow more time for a response signal to be received.

The INMARSAT-B (TM) System Definition Manual, Issue 2, dated September 1989, proposes programming a facsimile interface unit to send a sequence of flags to a facsimile terminal if no response signal is detected within a predetermined period of receiving a command therefrom so that the time limits for response set out in Recommendation T.30 are not exceeded at the facsimile terminal.

Another scheme that is used in the Global System for Mobile Communications (GSM) non-transparent facsimile service (GSM 03.46) is blind blocking of retransmitted commands. Here the facsimile adapter blocks re-transmitted commands from reaching the remote end until a response is received from the remote end. This response is then forwarded to the command sending entity which thinks that it is a response to the most recently retransmitted command although it is a delayed response to the first transmitted command. This scheme has the potential danger of timing out at the post-message phase of the facsimile call if too many retransmissions occurred during image transfer phase of facsimile call. WO 95/22224 provides a solution to the long delay problem by using the flag-stuffing, where the HDLC flags are autonomously generated by Intelligent Facsimile Relay (IFR) equivalents. The facsimile interface unit disclosed in WO 95/22224 detects a transmitted signal from a transmitting facsimile apparatus and detects whether a response signal to said transmitted signal is received from another facsimile apparatus within a predetermined period. If no response signal is detected after a predetermined period, a command-repeat (CRP) is transmitted to the command-sending entity. This forces the command sending entity to repeat the previously transmitted command until a response is received from the remote end. While this takes care of the time-out problem of T.30, the problem of collision at the 2-wire link is not solved. This is especially true when there is a long delay in the Public Switch Telephone Network (PSTN) leg of the connection and the delay is unknown. A consequence of this is that the CRP is received in error by the command sending entity.

While blind blocking, flag-stuffing techniques and the like may be used for transparent facsimile services that do not use retransmission of GSM air interface, it poses the danger of loss of the very first transmitted command on the air interface, making the scheme too sensitive to channel impairments. Furthermore, many facsimile machines ignore the first DIS command.

SUMMARY OF THE INVENTION

This invention provides a technique that will permit reliable facsimile transmission in presence of long delays. The main advantage of this technique is that it does not require specific knowledge of the delays in the system in order to avoid signal collision and to keep the connection alive.

Essentially the methods and apparatus disclosed in the described embodiments provide monitoring and/or manipulation through the use of entities, referred to as Intelligent Facsimile Relays (IFRs) that are physically located between the two end facsimile machines communicating over a long delay and possibly impaired link. The IFRs constantly monitor (and if necessary manipulate) the ITU-T T.30 protocols in both directions and intelligently decides to transmit, relay, buffer, or discard individual messages in the T.30 protocol. The primary intent here is to detect and avoid signal collisions on two wire interfaces and simultaneously prevent disconnects due to repeated ITU-T T.30 time-outs. In addition to monitoring, whenever it is necessary to manipulate T.30 messages (such as manipulation of user rates in Digital Identification Signal (DIS), intentionally disabling End Communication Message (ECM) mode of operation, etc.), the IFRs perform a forced corruption if the IFRs themselves receive a T.30 message in error. Furthermore, the IFR appropriately generates and transmits standard non-user specific T.30 messages in place of the messages received from the end facsimile machines, thereby preventing the possibility of blindly relaying a possibly corrupted message to the other end. This provides additional robustness to the T.30 protocol handling.

Briefly summarized, the present invention relates to a facsimile transmission relay apparatus for improving call success rates in long delay environments. The apparatus, discloses in the embodiment, herein and intelligent facsimile relay, has a first bi-directional telecommunication interface for receiving a facsimile signal from a transmitting facsimile device via a first network, such as the PSTN. The relay apparatus is provided with a buffer memory for storing the facsimile signals from the transmitting facsimile device, and a second bi-directional telecommunication interface facilitates the retransmission of the facsimile signal via a second network to a receiving facsimile device, e.g., via a wireless telecommunications network. An information processor is coupled to the second interface monitoring messages from the receiving facsimile device and for generating messages to the receiving facsimile device in order to maintain communications from the transmitting facsimile device via the first and second networks.

It will be understood that both the foregoing general description and the following detailed description are exemplary and intended to provide further explanation of the invention as claimed. The accompanying drawings provide an understanding of the invention as described in the preferred embodiments to illustrate the invention and to serve to explain the principles of the invention.

DETAILED DESCRIPTION OF THE PREFERRED EMBODIMENTS

Figure 1:
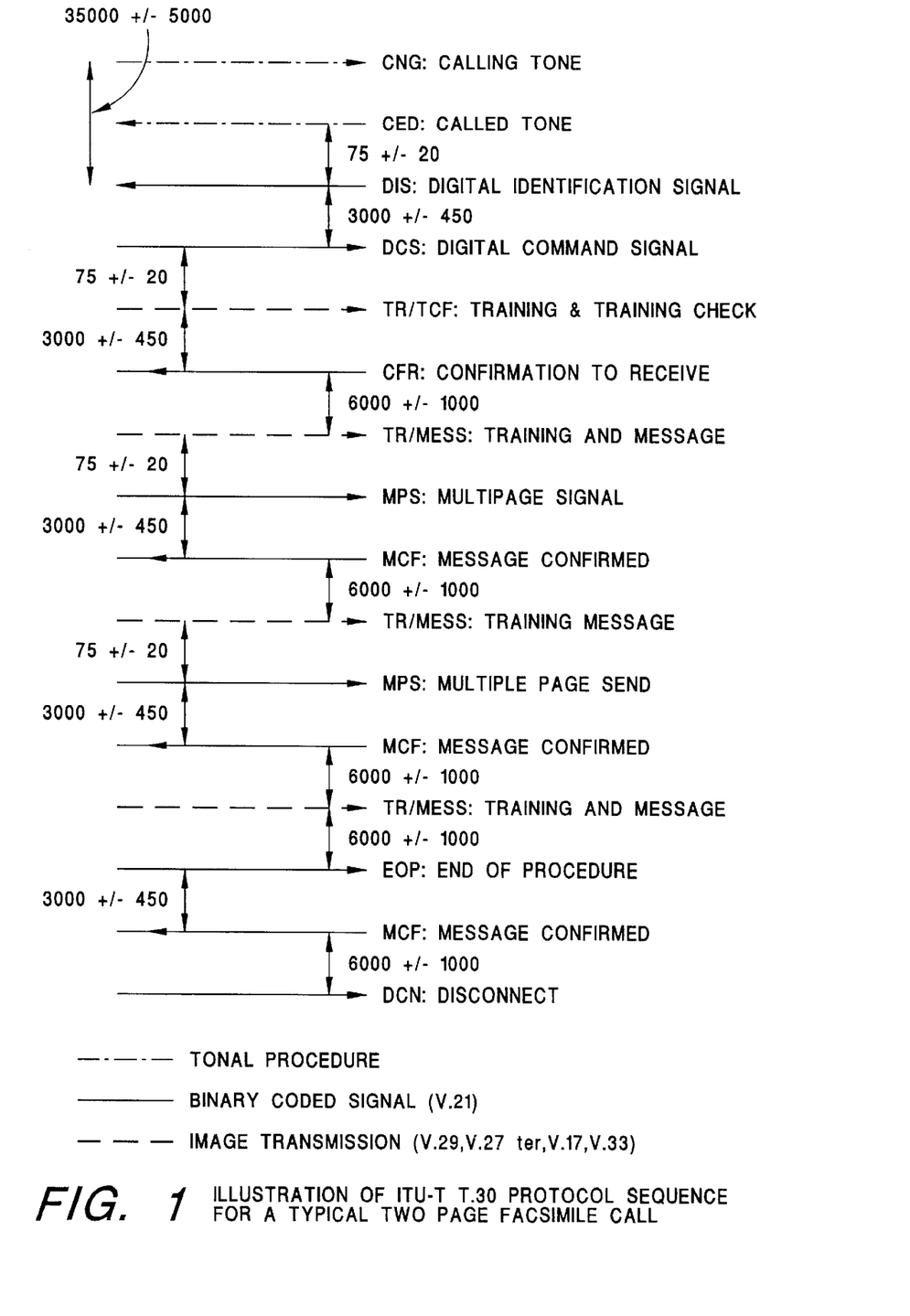
FIG. 1 is an illustration of ITU T T.30 protocol sequence for a typical two-page facsimile call.

Facsimile transmission in presence of long propagation delays is a challenging issue due to the strict time-outs governed by the command/response sequences as defined in ITU-T T.30 . A typical command/response sequence for a two page facsimile call is illustrated in FIG. 1. As seen from FIG. 1, different phases of the facsimile transmission have different time-outs and the worst case time-out is 2.55 seconds. Systems that provide wireless access to its customers typically experience delays of several hundred milliseconds between subscriber and base stations, and the delay is even longer when access is via geostationary satellite links, i.e., a wireless link 10. Such systems have to provide acceptable facsimile quality of service in call scenarios which should include international calls to and from the Public Switched Telephone Network (PSTN) 12 users where PSTN 12 itself may have an Intelsat satellite link which uses Digital Circuit Multiplication Equipment (DCME) conforming to ITU-T G.766. This delay, in addition to the delay that the facsimile machine itself introduces to formulate a response, may potentially exceed the 2.55 seconds timeout.

Figure 2:
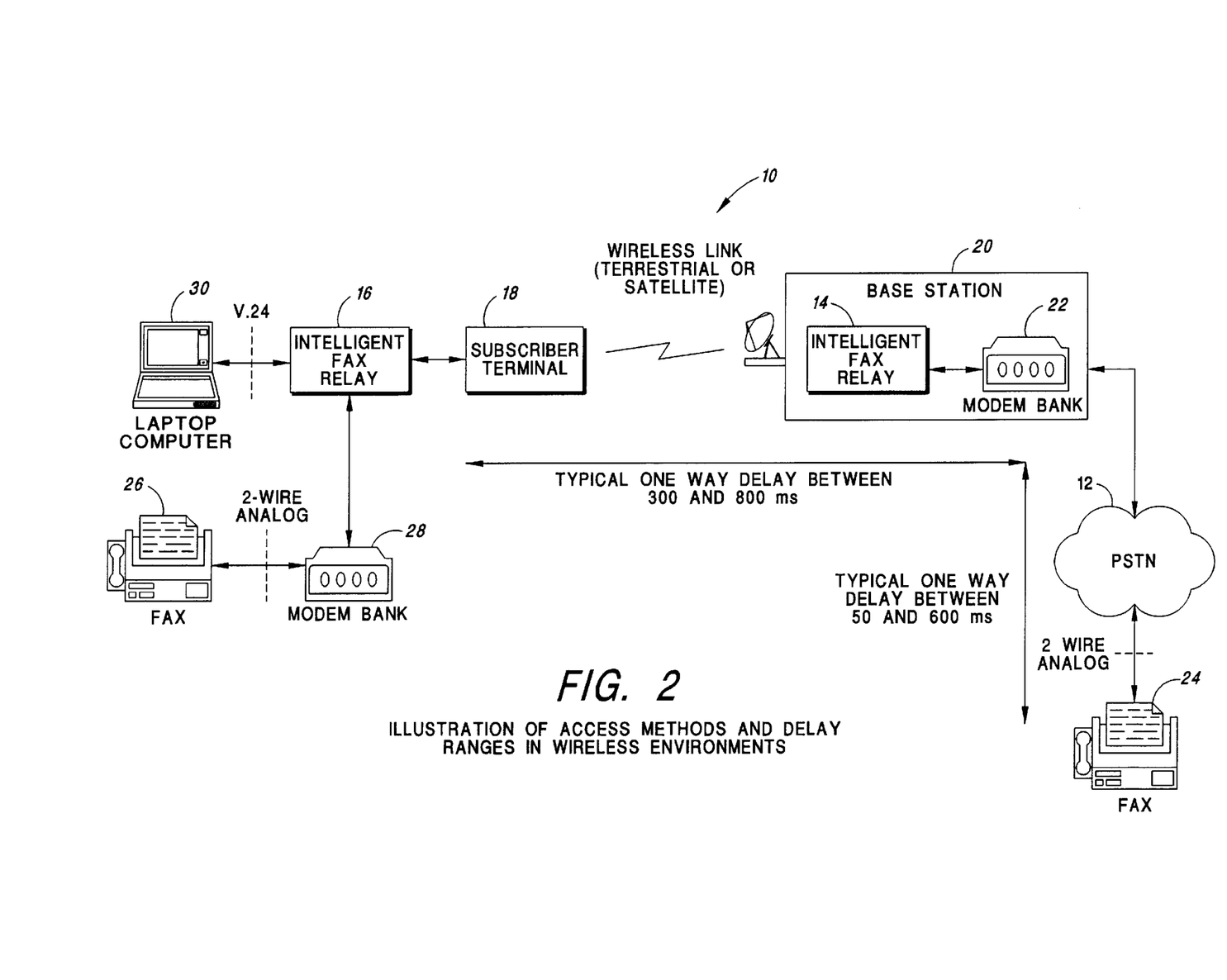
FIG. 2 is an illustration of access methods and delay ranges in wireless environments.

The conceptual block diagram of FIG. 2 shows the base station 20 including a modem bank 22 which interfaces with the PSTN 12. A facsimile machine 24 interfaces with the PSTN 12 of the base station and via conventional 2-wire analog telephone interface. The facsimile service can be enhanced with the implementation of a pair of Intelligent Facsimile Relays (IFRs) 14, 16 that are physically located in the wireless network (one at subscriber terminal and one at base station 20), successful facsimile call completion rate is expected to increase dramatically. On the subscriber end of the wireless link 10, the subscriber terminal 18 is connected to the IFR 16 of the described embodiment, which may be coupled either to a subscriber end modem bank 28 which also is interfaced to a facsimile machine 26 via a 2-wire analog telephone interface, or alternatively the IFR 16 may be connected to a personal computer such as laptop computer 30 via a V.24 telecommunications interface or the like. As illustrated, combined propagation delays relating to the wireless link 10, which may include terrestrial or satellite communications, typically result in one-way delay between 300 and 800 milliseconds, additionally the PSTN .12 typically includes a one-way delay between 50 and 600 milliseconds. Thus, it can be appreciated that while typical delays may be on the order of 1.5 seconds, such delays may potentially exceed the 2.55 second timeout associated with typical DCME equipment conforming to ITU-T standards.

FIG. 2 also illustrates the access methods and a range of typical delays as seen in wireless access systems. The upper limits of wireless access delay in FIG. 2 is applicable when the access is a geostationary mobile satellite system that uses hundreds of milliseconds of interleaving to accommodate possible fading. The upper limit of PSTN 12 delay is typical of some Intelsat links with DCME equipments conforming to G.766. It is noted that for subscriber-to-subscriber calls, the total one-way delays can be even longer than what is illustrated in FIG. 2.

Figure 3:
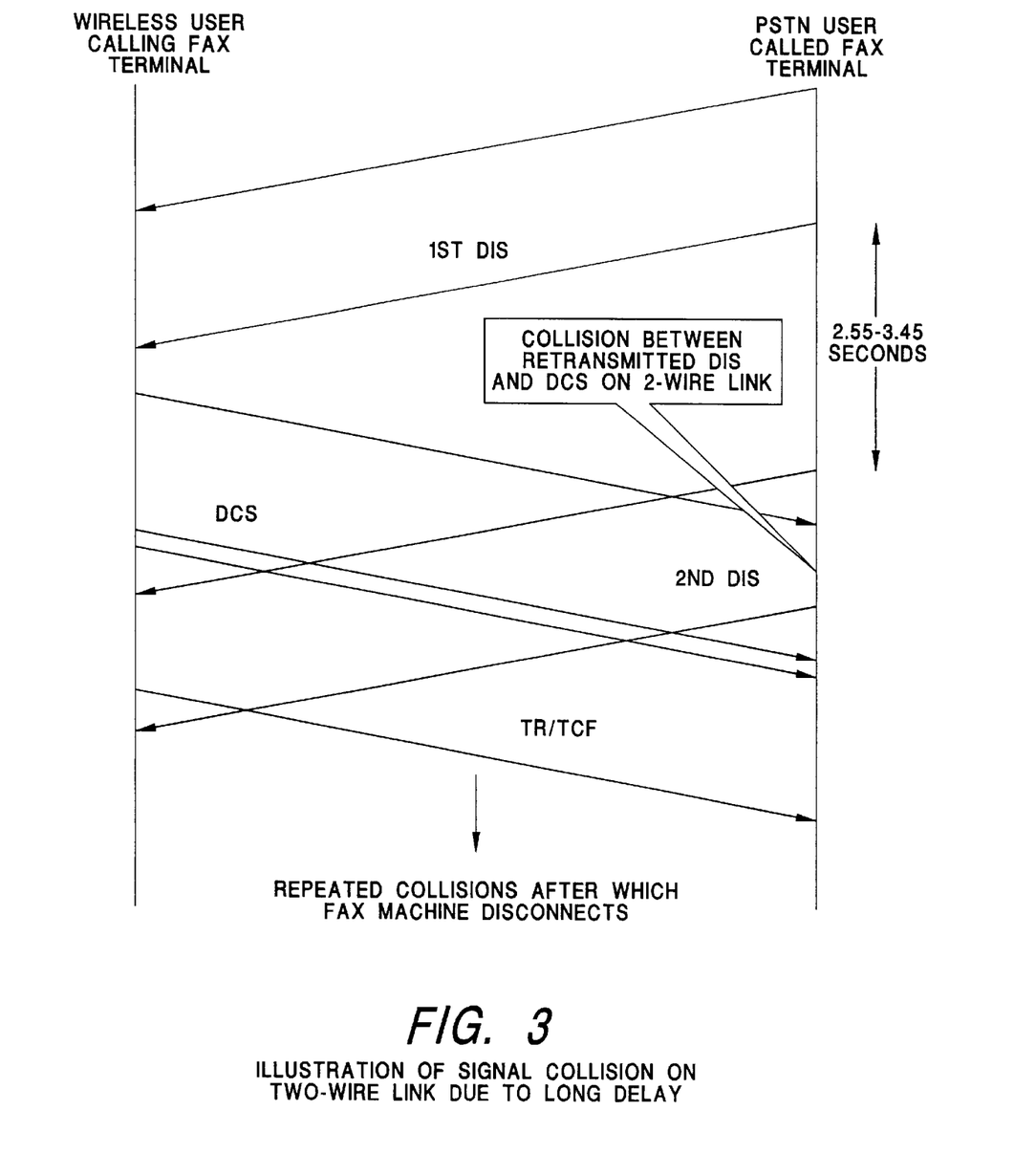
FIG. 3 is an illustration of signal collision on two-wire link due to long delay.

One of the deleterious consequences of long delays in facsimile transmission is the signal collision effects on the 2-wire link between a PSTN user and the nearest central office and/or between the wireless user and the IFRs 14, 16 nearest to it. This is illustrated in FIG. 3 where a retransmitted Digital Identification Signal (DIS) collides with Digital Command Signal (DCS). The primary goal of the proposed solution is to complete the pre-message (Phase B as defined in ITU-T T.30) and post-message (Phase D as defined in ITU-T T.30) handshaking of the T.30 successfully, by having the IFR monitor, store, and regenerate the T.30 handshake messages and responses. The IFRs 14, 16 are described in terms of the specific functionality of the apparatus to solve a specific problem. Although most of the description is centered around the IFR located in the base station (referred to as Network _IFR), most of the techniques are equally applicable to the IFR located at subscriber side (referred to as Subscriber IFR).

It is however not necessary that all techniques described in this invention be implemented on subscriber-IFR. One extreme case where collision techniques need not be implemented in subscriber-IFR is when the wireless channel and the facsimile connection to the wireless subscriber are completely 4-wire and entities controlling these 4-wire links also operate in full-duplex mode. Furthermore, if it is known that the wireless channel is either half-duplex or it is controlled by an entity operating in half-duplex manner, it is possible for network-IFR to use exactly the same techniques on wireless channel side to avoid collision as it would use to avoid collision on the PSTN link.

As seen in FIG. 3, the retransmitted DIS signal collides with DCS (the response to first DIS) in the 2-wire link of the PSTN user. This will result in loss of DIS and DCS. Furthermore, all further attempts to retransmit command will result in collision because of the synchronous nature in which commands and responses are generated and the fixed delay between the two facsimile machines. Hence the call terminates with a Disconnect (DCN) message from the calling facsimile terminal during the pre-message phase (Phase B) of the facsimile call.

Figure 4:
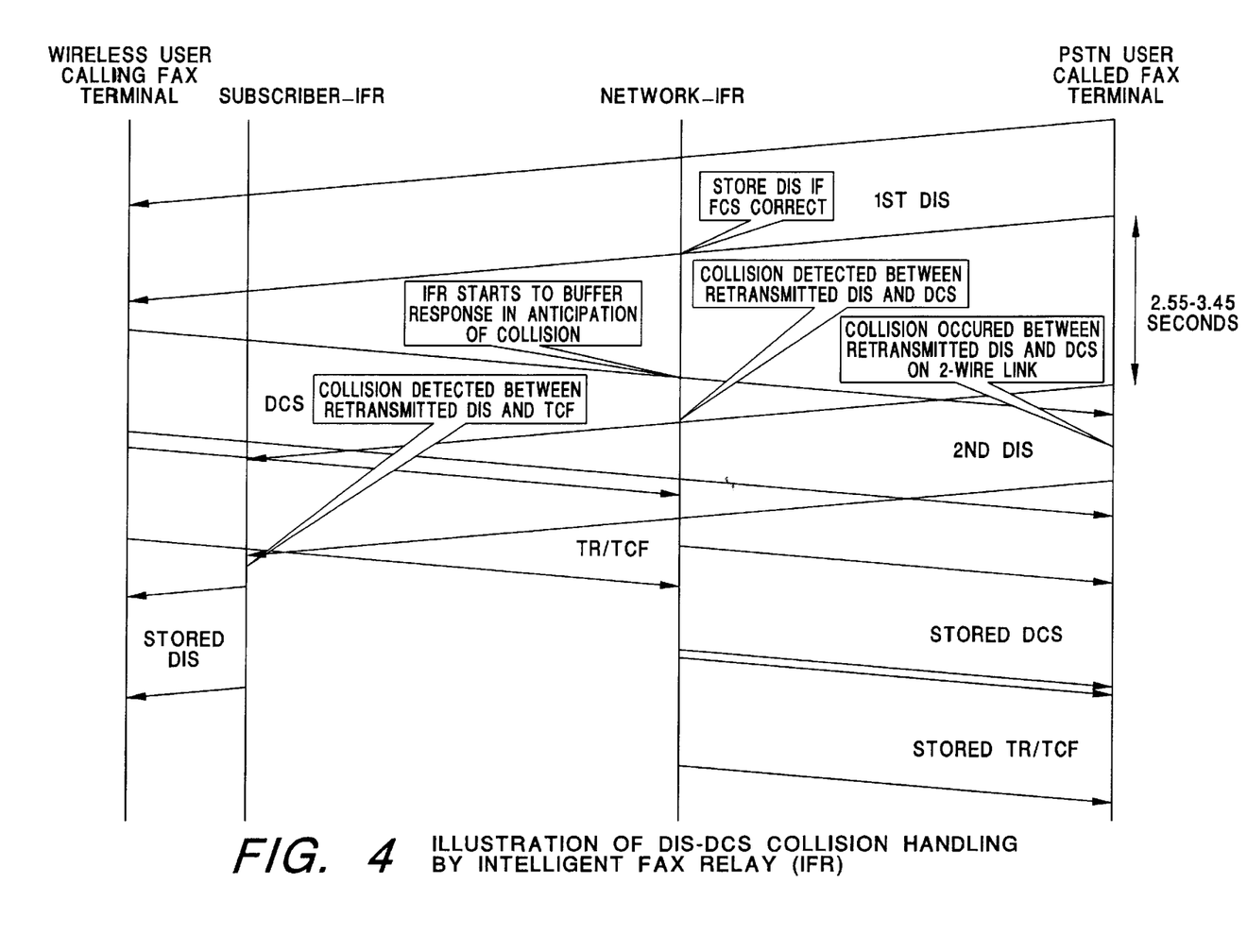
FIG. 4 is an illustration of DIS-DCS collision handling by intelligent facsimile relay (IFR)

Accordingly, the IFRs 14, 16 monitor T.30 and make intelligent decisions as to whether the response to a command should be forwarded to the other end. The objective is to avoid collision at the 2-wire link and successfully complete Phase B portion of the call. The Network_IFR only forwards the response received from the wireless user if nothing is being received from the PSTN user at that instant of time. Otherwise, Network_IFR buffers the response and does not forward it to the PSTN user until signal from PSTN user has stopped for at least 200 ms. If during transmission of response to the PSTN user, signal presence is detected at the Network_IFR from PSTN user, the buffered signal will be retransmitted after 200 ms after signal from PSTN user has ended. This is illustrated in FIG. 4. This scheme avoids collision on the 2-wire link since delay between Network IFR and PSTN user is not as large as the delay between wireless user and PSTN user, thereby ensuring that the buffered response reaches PSTN user before another 2.55 second T.30 time-out occurs. The above-mentioned scheme is based on the assumption that an observation of collision (detection of simultaneous signals in both directions) at Network_IFR implies collision at the 2-wire interface at PSTN 12.

There may also be cases where a collision has indeed occurred on the 2-wire interface at PSTN 12 which does not result in a detection of collision at Network_IFR. In order to accommodate such possibility, the Network_IFR also verifies the FCS associated with the retransmitted DIS and if FCS fails, the buffered response from wireless user is retransmitted to the PSTN user. Towards the wireless user, the stored DIS will be transmitted (if the first DIS was received by Network_IFR correctly).

Figure 5:
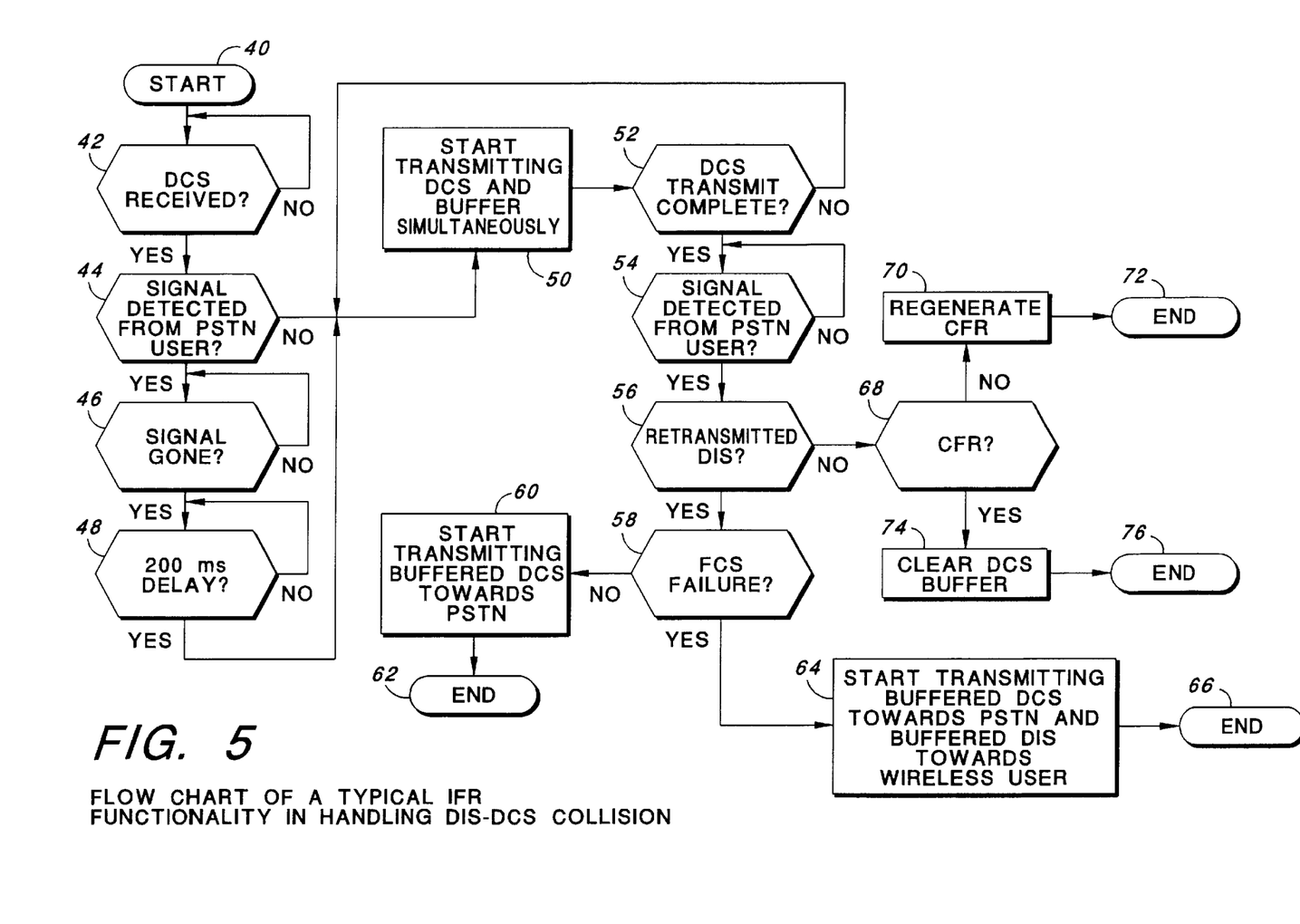
FIG. 5 is a flow chart of a typical IFR functionality in handling DIS-DCS collision.

A flow chart of the handling of T.30 messages by IFR is illustrated in FIG. 5. Program flow starts at step 40, with the information processor of the IFR determining whether the DCS message was received at step 42. When the DCS is received, step 44 determines whether the signal was detected from a PSTN user. If the PSTN user generated the DCS signal, step 46 waits for the DCS signal to complete, and when the DCS is gone, step 48 introduces a 200 millisecond delay before the information processor retransmits the DCS signal in step 50. As the DCS signal is not generated from the PSTN user at step 44, then retransmission of the DCS and a simultaneous buffering of the DCS signal into a buffer memory by the information processor is provided at step 50. Step 52 then determines whether the DCS transmission is complete and upon complete DCS transmission, step 54 checks for signal detection from the PSTN user, and a program represented at step 54 waiting for signals from the PSTN user. Upon receiving a signal from the PSTN user, step 56 determines whether DIS signal was retransmitted. Upon receipt of the DIS signal, step 58 determines whether a Frame Check Sequence (FCS), Cyclic-Redundancy Check (CRC), or the like was received from the PSTN user. If the FCS failure was not detected at step 58, then step 60 starts transmitting the buffered DCS towards the PSTN, and the end of the program is executed at step 62. If however a FCS failure occurs and is detected at step 58, step 64 starts transmitting the DCS towards the PSTN and also transmits the buffered DIS towards the wireless user, and the end of the program is executed at step 66. Where a DIS signal was not transmitted from the PSTN user from step 56, the determination is made at step 68 for Confirmation to Receive (CFR), and where CFR was not received, step 70 regenerates the CFR signal, and program flow ends at step 72. Where the CFR was received at step 68, then the information processor clears the DCS signal from the memory buffer at step 74, and program flow ends at step 76. The information processor employed in the described embodiment is a Texas Instruments TMS C30/C31 digital signal processor, provided on the Tiger development board by DSP Research, Inc., California, although any variety of digital signal processor may be appropriate for this application with approximately a one kilobyte memory buffer for storing signals received at the IFR. The message handling is described further below with respect to the T.30 standard protocol.

Handling DIS Manipulation

In many bandwidth constrained systems, it is not guaranteed that sufficient bandwidth will be available to carry out facsimile call at any given user rate. For example, there may only be sufficient bandwidth to carry a 4.8 kbps call but insufficient to carry 7.2 kbps and above. The facsimile machines 24, 26 themselves are unaware of this constraint and hence the receiving facsimile machine tries to identify its normal capabilities via the DIS command. It is therefore the responsibility of IFR to ensure that the DIS is manipulated such that it shall not be possible for the sending facsimile machine to select a rate higher than the established rate (in the above example 4.8 kbps) in the DCS message. For example, the facsimile adapter in GSM (GSM 03.45) blindly manipulates the DIS and recomputes the Frame Check Sequence (FCS) before sending it to the calling facsimile machine. Therefore, even if the DIS was received incorrectly by the facsimile adapter due to channel impairments, the manipulated DIS is transmitted with correct FCS. This poses a significant danger to the facsimile call since some elements of the DIS message (other than user rate fields) were incorrect-even before IFR had received it. However, due to recomputation of FCS by IFR, the calling facsimile machine interprets the incorrect elements as truly sent by the called facsimile machine.

Thus, the FCS of manipulated DIS is intentionally made incorrect if the original DIS itself was incorrect. This should ensure that the calling facsimile machine ignores the manipulated DIS.

Handling of Standard (Non-user Specific) Messages in T.30

Standard protocol messages of T.30 such as Confirmation to Remove (CFR) and Message Confirmation (MCF) are treated specially by IFRs 14, 16. Even if these messages are received incorrectly by IFR 14, 16 from the facsimile machine 26, 28 nearest to it, the IFR 14, 16 sends a correct CFR and MCF, since there is one and only one format for these messages. Accordingly, the IFR 14, 16 stores these standard messages and simply forwards them to the remote end whenever it receives there messages from the facsimile machine 26, 28 nearest to it. Such a scheme provides additional robustness to critical positions of T.30 protocol.

Handling TCF Errors

The conventional modems such as V.27, V.29 that are responsible for message data generation in a typical IFR (at both ends) may introduce erroneous data during their circuit turn on and off. As a result, the Training Check Facility (TCF) message, which is supposed to be a train of all zeroes for a period of 1.5 seconds, gets corrupted. Some facsimile machines 24, 26 are very intolerant to the corrupted TCF and issue a "Failure to Train" negative response instead of a positive response CFR. Thus the corrupted TCF, which is caused by the modem switching rather than genuine channel errors, causes the unnecessary training down sequence in the facsimile protocol.

The IFRs 14, 16 forcibly correct the TCF bytes at the beginning and end for user rates above 2.4 kbps. For user rate of 2.4 kbps, the IFR forces all TCF bytes (essentially autonomously generating bytes containing zeroes) except the last 12 bytes to be correct and at the same time keeps count of the bit error rate of the traffic control received over the wireless link. If the Bit Error Rate (BER) has crossed a threshold of 10%, then all the remaining twelve bytes are intentionally corrupted thereby causing a Failure to Train (FTT) from the receiving facsimile machine that will result in retransmission of DCS and TCF from the sending facsimile machine.

This special consideration to 2.4 kbps stems from the observation that in mobile wireless applications, since it is quite possible that the fade event on the wireless channel coincided with TCF duration and that the fade would disappear by the time the actual page is transferred. Since 2.4 kbps is the lowest bit rate that ITU-T T.30 specifies, there is no room for further fall-backs and hence every attempt is made to keep the facsimile session alive. However, if the BER exceeds 10%, then one can conclude that the channel is severely impaired and hence unusable from a page transmission point of view.

It should be appreciated that a wide range of changes and modifications may be made to the preferred embodiments for improving facsimile call success rates in long delay environments as described herein. Thus, it is intended that the foregoing detailed description be regarded as illustrative rather than limiting, and that the following claims, including all equivalents, are intended to define the scope of the invention.

What is claimed is:

1. A facsimile transmission relay apparatus for improving call success rates in long delay environments, comprising:
    a first bi-directional telecommunication interface for receiving a first facsimile signal from a transmitting facsimile device and retransmitting a second facsimile signal from a receiving facsimile device via a first network;
    a buffer for storing said first and second facsimile signals;
    a second bi-directional telecommunication interface for receiving said second facsimile signal and retransmitting said first facsimile signal via a second network to said receiving facsimile device; and
    an information processor coupled to said first and second interfaces for monitoring messages from the transmitting and receiving facsimile devices and for generating messages to the receiving facsimile device to maintain communications with the transmitting facsimile device via the first and second networks,
    wherein said information processor buffers signals received via said first and second bi-directional telecommunications interfaces in said buffer to avoid collisions with signals transmitted via said second network from the receiving facsimile device.

2. A facsimile transmission relay apparatus for improving call success rates in long delay environments, comprising:
    a first bi-directional telecommunication interface for receiving a first facsimile signal from a transmitting facsimile device and retransmitting a second facsimile signal from a receiving facsimile device via a first network;
    a buffer for storing said first and second facsimile signals;
    a second bi-directional telecommunication interface for receiving said second facsimile signal and retransmitting said first facsimile signal via a second network to said receiving facsimile device;
    an information processor coupled to said first and second interfaces for monitoring messages from the transmitting and receiving facsimile devices and for generating messages to the receiving facsimile device to maintain communications with the transmitting facsimile device via the first and second networks;
    wherein said information processor buffers signals received via said first and second bi-directional telecommunications interfaces in said buffer to avoid collisions with signals transmitted via said second network from the receiving facsimile device; and
    wherein said information processor determines whether a Frame Check Sequence (FCS) was received via the second network providing the collision detection mechanism based on the computed FCS and the retransmission of the buffered signal if the FCS failed.

3. A facsimile transmission relay apparatus for improving call success rates in long delay environments, comprising:
    a first bi-directional telecommunication interface for receiving a first facsimile signal from a transmitting facsimile device and retransmitting a second facsimile signal from a receiving facsimile device via a first network;
    a buffer for storing said first and second facsimile signals;
    a second bi-directional telecommunication interface for receiving said second facsimile signal and retransmitting said first facsimile signal via a second network to said receiving facsimile device; and
    an information processor coupled to said first and second interfaces for monitoring messages from the transmitting and receiving facsimile devices and for generating messages to the receiving facsimile device to maintain communications with the transmitting facsimile device via the first and second networks;
    wherein said information processor performs a Training Check Facility (TCF) calculate a Bit Error Rate (BER) using TCF messages generated using said information processor.

4. An apparatus as recited in claim 3 wherein the BER is calculated for the TCF bytes and if it exceeds a threshold, then a portion of the TCF is intentionally corrupted.

5. An apparatus as recited in claim 4 wherein the BER is calculated for the TCF bytes and if it exceeds a threshold of 10% then the last twelve bytes of the TCF is corrupted.

6. An apparatus as recited in claim 1 wherein said buffer comprises a memory for storing responses from command receiving entities and for avoiding collisions with a retransmitted command from the command sending entities.

7. A facsimile transmission relay apparatus for improving call success rates in long delay environments, comprising:
    a first bi-directional telecommunication interface for receiving a first facsimile signal from a transmitting facsimile device and retransmitting a second facsimile signal from a receiving facsimile device via a first network;

a buffer for storing said first and second facsimile signals;

a second bi-directional telecommunication interface for receiving said second facsimile signal and retransmitting said first facsimile signal via a second network to said receiving facsimile device; and an information processor coupled to said first and second interfaces for monitoring messages from the transmitting and receiving facsimile devices and for generating messages to the receiving facsimile device to maintain communications with the transmitting facsimile device via the first and second networks;

wherein said information processor buffers signals received via said first and second bi-directional telecommunications interfaces in said buffer to avoid collisions with signals transmitted via said second network from the receiving facsimile device;

wherein said buffer comprises a memory for storing responses from command receiving entities and for avoiding collisions with a retransmitted command from the command sending entities; and wherein said buffer comprises a memory for storing the Digital Command signal (DCS) from the transmitting facsimile device, and avoids collisions with the Digital Identification Signal (DIS) from the receiving facsimile device.

8. A message transmission system for improving facsimile call rates in long delay environments, comprising:

an interface for coupling a facsimile compatible transmission and reception device to a telecommunications network;

a bi-directional communications channel associated with said interface position between the facsimile compatible device and the telecommunications network; and an information processor coupled to said interface and said communications channel for monitoring messages transmitted by said device to said other facsimile compatible devices on the telecommunications network, for monitoring messages received from said other facsimile compatible devices, and for buffering the transmitted and received messages to avoid message collisions on the telecommunications network.

9. A system as recited in claim 8 wherein said information processor manipulates and generates messages to maintain communications between the devices.

10. A system as recited in claim 9 wherein said information processor identifies corruptive messages, replacing the corruptive messages with corrected messages for transmission over the telecommunications network.

11. A system as recited in claim 10 wherein said information processor is used to intelligently decide whether to transmit, rewrite, buffer, or discard individual messages.

12. A system as recited in claim 8 comprising a second information processor coupled to the telecommunications network for monitoring messages from a receiving facsimile device and for generating messages to the receiving facsimile device to maintain communications with a transmitting facsimile device via the telecommunications network.

13. A system as recited in claim 8 wherein said telecommunications network comprises a wireless network.

14. A system as recited in claim 8 wherein said interface is coupled to said facsimile device between a Public Switch Telephone Network (PSTN) and a wireless telecommunications network.

15. A method of facsimile message transmission for improving call rates in long delay environments, comprising the steps of:

coupling a facsimile compatible transmission and reception device to a telecommunications network;

providing a bi-directional communications channel between the facsimile compatible device and the telecommunications network for buffering messages transmitted between the device and other facsimile compatible transmission and reception devices coupled to the telecommunications network;

monitoring messages transmitted from said device to said other facsimile compatible transmission and reception devices and messages received from said other facsimile compatible transmission and reception devices; and buffering the transmitted and received messages with the communications channel to avoid message collisions on the telecommunications network.

16. A method as recited in claim 15 comprising the steps of interfacing the facsimile compatible transmission and reception device with the bi-directional communications channel with an information processor for monitoring messages received by and transmitted from the facsimile compatible transmission and reception device.

17. A method as recited in claim 16 wherein the information processor interfaces with the telecommunications network for monitoring and manipulating transmitted and received messages to avoid and correct message signal corruption.

* * * * *